US008145525B2

(12) United States Patent
Zeevi et al.

(10) Patent No.: US 8,145,525 B2
(45) Date of Patent: Mar. 27, 2012

(54) PRECISE MEASUREMENT OF POINT-OF-SALE PROMOTION IMPACT

(75) Inventors: Dani Zeevi, Or-Yehuda (IL); Amir Kaminsky, Tel Aviv (IL); Maayan Hope, Kfar Saba (IL)

(73) Assignee: YCD Multimedia Ltd., Shefayim (IL)

( * ) Notice: Subject to any disclaimer, the term of this patent is extended or adjusted under 35 U.S.C. 154(b) by 520 days.

(21) Appl. No.: 12/337,786

(22) Filed: Dec. 18, 2008

(65) Prior Publication Data

US 2010/0161422 A1 Jun. 24, 2010

(51) Int. Cl.
*G06Q 30/00* (2012.01)

(52) U.S. Cl. .............. 705/14.41; 705/14.43; 705/7.29; 705/7.31

(58) Field of Classification Search ............. 705/14.41, 705/14.43, 7.29, 7.31
See application file for complete search history.

(56) References Cited

U.S. PATENT DOCUMENTS

| | | | | |
|---|---|---|---|---|
| 5,331,544 | A | * | 7/1994 | Lu et al. ............... 705/7.29 |
| 5,459,306 | A | | 10/1995 | Stein et al. |
| 6,119,099 | A | | 9/2000 | Walker et al. |
| 6,223,163 | B1 | | 4/2001 | Van Luchene |
| 6,401,074 | B1 | | 6/2002 | Sleeper |
| 6,529,879 | B1 | | 3/2003 | Hasegawa |
| 6,717,522 | B1 | * | 4/2004 | Nagatomo et al. ......... 340/815.4 |
| 7,136,906 | B2 | | 11/2006 | Giacalone, Jr. |
| 7,249,053 | B2 | | 7/2007 | Wohlers et al. |
| 7,383,200 | B1 | | 6/2008 | Walker et al. |
| 2002/0072972 | A1 | | 6/2002 | Lamont |
| 2003/0083936 | A1 | | 5/2003 | Mueller et al. |
| 2003/0220830 | A1 | | 11/2003 | Myr |
| 2004/0103570 | A1 | | 6/2004 | Ruttenberg |
| 2006/0235755 | A1 | | 10/2006 | Mueller et al. |
| 2006/0280315 | A1 | | 12/2006 | Norris et al. |
| 2007/0038516 | A1 | * | 2/2007 | Apple et al. ............ 705/14 |
| 2007/0073585 | A1 | | 3/2007 | Apple et al. |
| 2007/0073589 | A1 | | 3/2007 | Vergeyle et al. |
| 2007/0143186 | A1 | | 6/2007 | Apple et al. |

OTHER PUBLICATIONS

International Application PCT/IB09/51384 Search Report dated Apr. 2, 2010.
U.S. Appl. No. 09/603,677, filed Jun. 26, 2000, Mueller et al.
U.S. Appl. No. 12/082,809, filed Apr. 14, 2008, Zeevi et al.
International Application PCT/IB09/55456 Search Report dated Jul. 13, 2010.
"IBM SurePOS 500 Series", IBM Retail Store Solutions, IBM Corporation, Research Triangle Park, NC 27709, USA, 2007.
"Visual Deal™" by RetailDNA, LLC, 2002 (www.retaildna/vd_howitworks.com).
"SBOnet™", Dumac Business Systems Inc., East Syracuse, NY 13057, USA, 2002 (www.dumac.com/solutions/quickservice/sbonet.html).
U.S. Appl. No. 12/082,809 Official Action dated Apr. 4, 2011.

\* cited by examiner

*Primary Examiner* — Raquel Alvarez
(74) *Attorney, Agent, or Firm* — D. Kligler IP Services Ltd

(57) ABSTRACT

A method for distribution of information includes displaying a sequence of promotional images at known, respective display times on a display terminal facing customers at a point of sale. Sales of different products at respective sale times are recorded on a sales terminal at the point of sale. A relationship between the sales times of at least one of the products and the display times of at least one of the promotional images is measured. Responsively to the relationship, a change is made in the sequence of the promotional images that are displayed on the display terminal.

26 Claims, 5 Drawing Sheets

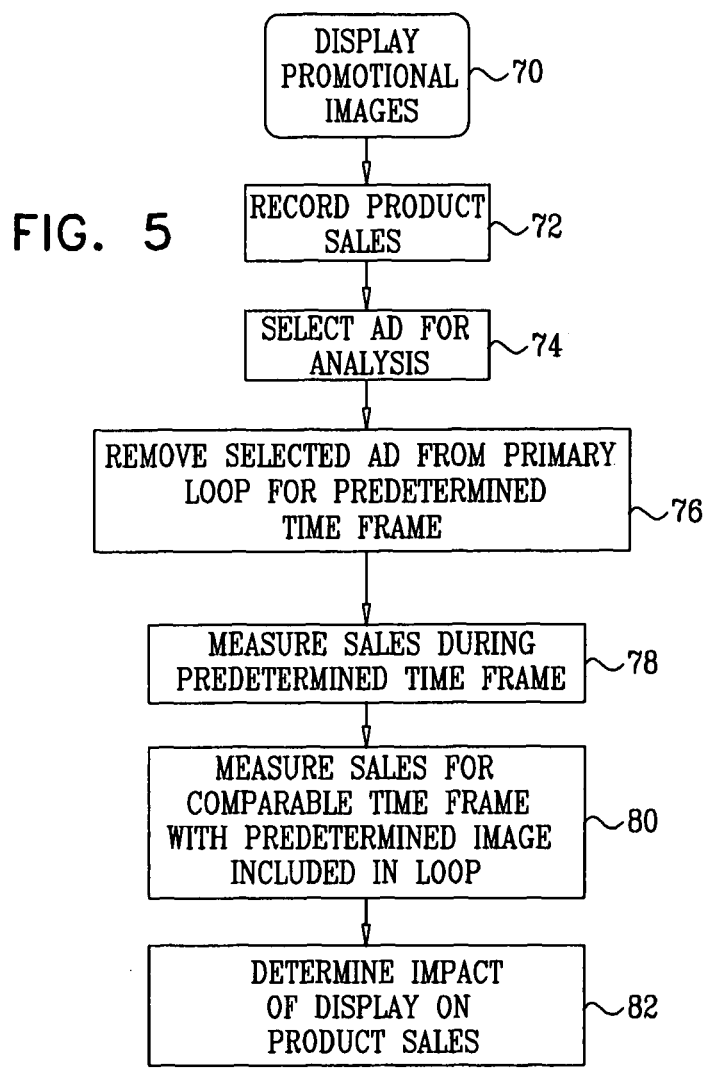
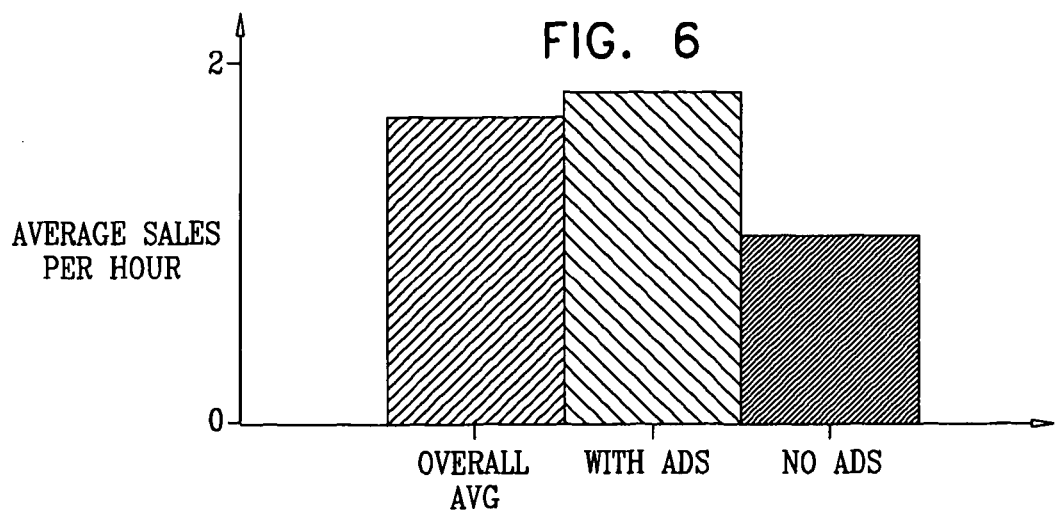

PRECISE MEASUREMENT OF POINT-OF-SALE PROMOTION IMPACT

FIELD OF THE INVENTION

The present invention relates generally to information distribution systems, and specifically to methods for measuring the impact of point-of-sale promotional displays.

BACKGROUND OF THE INVENTION

Retail locations execute sales transactions using point-of-sale ("POS") terminals, such as cash registers. Some POS terminals additionally track purchases made and adjust a database of store inventory accordingly. Other POS systems print promotions on the sales receipt, while yet another type of POS system displays promotional images on electronic or video displays.

U.S. Pat. No. 6,223,163 to Van Luchene, which is incorporated herein by reference, describes a POS terminal or other computing device that provides a plurality of offers to customers, and then measures a performance rate of each offer. For example, the acceptance rate or the profit rate of the offers may be measured. Based on the performance rates, a subset of offers is selected. In one embodiment, the highest performing offers are selected. In another embodiment, those offers having performance rates above a predetermined threshold are selected. The selected subset of offers is then provided, while the remaining, less desirable offers are discontinued.

SUMMARY

Some embodiments of the present invention provide a method for distribution of information. The method includes displaying a sequence of promotional images at known, respective display times on a display terminal facing customers at a point of sale. Sales of different products at respective sale times are recorded on a sales terminal at the point of sale, and a relationship between the sales times of at least one of the products and the display times of at least one of the promotional images is measured. Responsively to the relationship, a change may be made in the sequence of the promotional images that are displayed on the display terminal.

In a disclosed embodiment, the promotional images advertise different, respective products, and measuring the relationship includes assessing an impact of displaying a given image in the sequence on a respective product that is advertised by the given image. Measuring the relationship may include assessing a further impact of displaying the given image on one or more other products that are not advertised by the given image.

Typically, measuring the relationship includes identifying the customers to whom a given promotional image was displayed at the point of sale, and evaluating the sales made to the identified customers. In one embodiment, measuring the relationship includes comparing the sales made to the identified customers with the sales made to other customers during a reference period in which the given promotional image was not displayed. Comparing the sales may include computing a sales uplift for a given product due to the given promotional image by comparing a first fraction of the identified customers who purchased the given product with a second fraction of the other customers who purchased the given product.

Additionally or alternatively, displaying the sequence of the promotional images includes displaying the given promotional image intermittently, so that most of the customers are not exposed to the image at the point of sale, and identifying the customers includes selecting the customers whose sales times fell within a specified period following each of the display times of the given promotional image. In a disclosed embodiment, selecting the customers includes estimating a length of a line of the customers waiting to make a purchase at the point of sale, and setting the specified period responsively to the estimated length.

Further additionally or alternatively, displaying the sequence of the promotional images includes displaying the given promotional image regularly during a baseline period, so that most of the customers are exposed to the image at the point of sale, and the reference periods include less than 20% (and most often around 10%) of a total operating time of the point of sale.

There is also provided, in accordance with an embodiment of the present invention, apparatus for distribution of information. The apparatus includes a display terminal for displaying a sequence of images to customers at a point of sale and a sales terminal, for recording sales of different products at respective sale times at the point of sale. A processor is coupled to the display terminal and to the sales terminal and is configured to drive the display terminal to display a sequence of promotional images at known, respective display times, and to measure a relationship between the sales times of at least one of the products and the display times of at least one of the promotional images.

There is additionally provided, in accordance with an embodiment of the present invention, a computer software product, including a computer-readable medium in which program instructions are stored, which instructions, when read by a computer, cause the computer to display a sequence of promotional images at known, respective display times on a display terminal facing customers at a point of sale, to record sales of different products at respective sale times on a sales terminal at the point of sale, to measure a relationship between the sales times of at least one of the products and the display times of at least one of the promotional images, and responsively to the relationship, to make a change in the sequence of the promotional images that are displayed on the display terminal.

There is further provided, in accordance with an embodiment of the present invention, a method for distribution of information, including displaying a sequence of promotional images on a display terminal facing customers at a point of sale and recording times of transactions made by the customers on a sales terminal at the point of sale. Responsively to the recorded times, a length of a waiting line of the customers at the point of sale is estimated. Responsively to the estimated length, a change is made in the sequence of the promotional images that are displayed on the display terminal.

In a disclosed embodiment, estimating the length includes assessing the length responsively to a period elapsed between successive ones of the transactions.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein:

FIG. 5 is a flow chart that schematically illustrates a method for measuring a relationship between display of a certain promotional image and product sales, in accordance with another embodiment of the present invention; and FIG. 6 is a bar chart showing the impact of display of a certain promotional image on sales of a product promoted by the image, in accordance with an embodiment of the present invention.

DETAILED DESCRIPTION OF EMBODIMENTS

Overview

Figure 1:
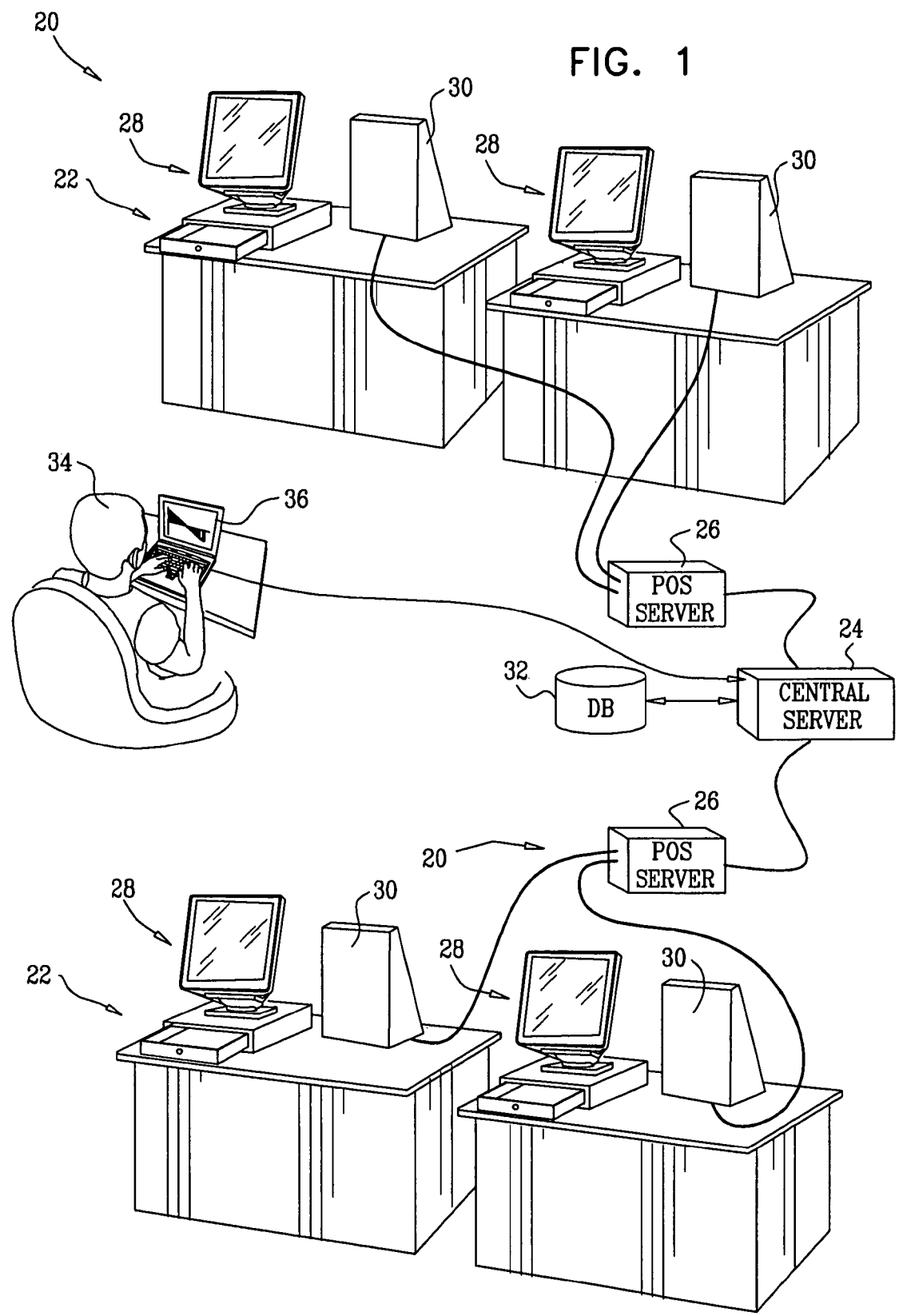
FIG. 1 is a schematic, pictorial illustration of a system for measuring the impact of a point-of-sale promotional image, in accordance with an embodiment of the present invention.

Embodiments of the present invention that are described hereinbelow provide improved methods, products and systems for measuring an impact of a time-varying point-of-sale (POS) promotional display upon sales volumes of products offered at the POS. The promotional display shows a sequence of promotional images, each for a different product on sale in an establishment. The customer impact is measured by correlating a display of a given image with the sales volume of products among customers who can be assumed to have viewed the image, in comparison with sales volume at other times. Analysis at the point of sale in this manner permits precise, immediate measurement of the impact of the promotional display.

In embodiments of the invention, a computerized POS merchandising subsystem is configured to exhibit a sequence of promotional images at known, respective display times on a display terminal. The images are viewed by customers making a purchase or waiting in a queue at a point of sale in a business establishment, as described hereinbelow. The sequence may include a primary loop of promotional images that are displayed regularly, at short intervals (typically showing best-selling products and, optionally, new products to establish customer awareness), as well as a secondary group of promotional images that are displayed intermittently. Sales of different products are recorded on a sales terminal that is part of the POS merchandising subsystem. The impact of the promotional images exhibited by the POS merchandising subsystem on sales of the different products is determined by measuring a relationship between sales of at least one of the products and display times of at least one of the promotional images, as described hereinbelow. In the context of the present patent application and in the claims, the terms "sale" and "order," refer to any sales transaction made by the customer at the point of sale. For brevity, promotional images are also referred to as advertisements or "ads" in the description that follows.

The methods of data collection and analysis that are described herein may be applied to measure the impact of an image both on sales of the product that it is meant to promote and on sales of other products. Because of the intimate connection between the display and sales terminals at the point of sale, the POS subsystem is able to correlate each sale reliably with the promotional images that were (or were not) shown to the customer just before the sale was made. These methods thus permit more precise measurement of advertising impact than methods that are known in the art. Furthermore, because of their ability to measure cross-impact between images that promote one product and sales of other products (as well as overall sales and transaction size), these methods enable the establishment in question to optimize its POS advertising so as to increase overall revenues and profits.

In response to analysis of the impact, changes may be made in the sequence of promotional images that are shown on the display terminal. The changes may be carried out automatically by the POS system or under control of a human manager. In some embodiments, a management station is connected to a POS server to enable a human system manager or an automated management software program to analyze the impact of the promotional images and to consequently change the sequence of promotional images that are displayed on the POS server. Typically, the sequence of the promotional images may be changed in response to the results of the analysis, or the time exposure of a particular promotional image may be increased or decreased.

Alternatively or additionally, images in the sequence that are found to be promotionally ineffective may be modified or replaced. For example, a number of different images promoting the same product may be evaluated by measuring the impact of each one on sales of the product, in order to select the best image to use in subsequent promotion.

Further alternatively or additionally, the sequence of images presented on the display terminal may include not only promotions of specific products, but also brand promotions, as well as entertainment content aimed at drawing customers' attention to the screen. The methods described herein may then be used to find the optimal mix of these different image types.

System Description

FIG. 1 is a schematic, pictorial illustration of a system 20 for measuring the impact of a point-of-sale promotional image, in accordance with an embodiment of the present invention. System 20 comprises one or more POS merchandising subsystems 22, which are deployed at respective retail locations, and at least one central server 24, which collects and processes information generated by subsystems 22. Server 24 may be deployed in the same retail location as subsystem 22 (and in some embodiments may be functionally integrated into subsystem 22 itself). Alternatively, server 24 may be deployed at a central location and collect information from multiple retail locations, such as branches of a retail chain.

POS merchandising subsystem 22 is similar to the subsystems that are disclosed in commonly-assigned U.S. patent application Ser. No. 12/082,809, filed Apr. 14, 2008, which is herein incorporated by reference. Subsystem 22 comprises a POS server 26, at least one POS sales terminal 28, and at least one customer-facing display terminal 30. Although these functional elements of subsystem are shown in the figures, for the sake of clarity, as separate physical units, any two or even all three of the elements may be integrated together in a single console that satisfies the functional requirements of the subsystem. In the example shown in the figure, sales terminal 28 is in communication with POS server 26, such as over a local area network (LAN), and POS server 26 is in communication with central server 24, such as over telephone lines or a wide area network (WAN), such as the Internet. Alternatively, POS server 26 may be located remotely from the retail locations, such in one or more central locations, possibly in the same location as central server 24. In any case, sales terminal 28 records sales transactions—including the items ordered and the time of the transaction—and passes the information to the POS server.

Display terminal 30 is positioned in a vicinity of a respective POS sales terminal 28 and is oriented so that customers making purchases or waiting in line to do so see the images that the terminal displays. Display terminal 30 is controlled by server 26 so as to display certain images at certain specific times, as explained further hereinbelow. For this purpose, the display terminal may be connected directly to its corresponding POS sales terminal 28, to POS server 26, or possibly to central server 24 and/or to one or more other computers that are suitably configured to drive the display terminal.

Central server 24 and POS servers 26 typically comprise one or more general-purpose computer processors with appropriate memory, communication interfaces and software for carrying out the functions prescribed herein. This software may be downloaded to the servers in electronic form, over a network, for example, or it may, alternatively or additionally, be provided and stored on tangible media, such as optical, magnetic or electronic memory. The memory may comprise a non-volatile memory, such as one or more hard disk drives, and/or a volatile memory, such as random-access memory (RAM). Central server 24 and/or POS servers 26 are typically coupled to at least one database 32, for storing data such as product information, sales history and analytical data. Alternatively, other data structures may be used to hold and access these data.

Display terminal 30 comprises a screen, such as a flat panel monitor or cathode ray tube monitor, which is capable of displaying visual information such as images, text, and video. The term "images" is used hereinbelow to refer to any and all sorts of visual information that may be displayed in this manner. Optionally, the display terminals may also play audio output in conjunction with the images.

Each POS sales terminal 28 typically comprises at least one microprocessor, which is connected to a memory, such as a RAM, hard disk, or combination thereof. For some applications, POS sales terminal 28 comprises a general-purpose personal computer programmed in software to carry out the functions described herein. Alternatively, some or all of the POS sales terminals may comprise "dumb" terminals, which are controlled, partially or substantially, by a separate device, such as POS server 24, which is either in the same location with the terminal or located remotely therefrom. As is known in the art, POS sales terminal 28 typically includes a cashier-facing display for displaying information to a cashier operating the terminal; one or more input devices, such as a keyboard, a touch screen, and/or a credit card reader; a cash drawer; and a printing device that prints out a sales receipt at the conclusion of a transaction. POS sales terminal 28 is used at a check-out line or similar retail transaction station within the respective retail location.

System 20 may be controlled by a system manager 34 who uses a management station 36 to interact with central server 24 and other elements of the system. Manager 34 may receive information from server 24 regarding the relationships between the timing of product sales, defined as the points in time at which sales are completed, and the specific intervals of exposure of the promotional images of the products. Manager 34 typically configures system 20 using system operation software in response to these relationships, as described hereinbelow. A software program executing in station 36 or server 24 analyzes the impact of the promotional images. Responsively to this impact, manager 34 or automated management software can change specific intervals of exposure or a sequence of promotional images that are displayed on display terminal 30.

Figure 2:
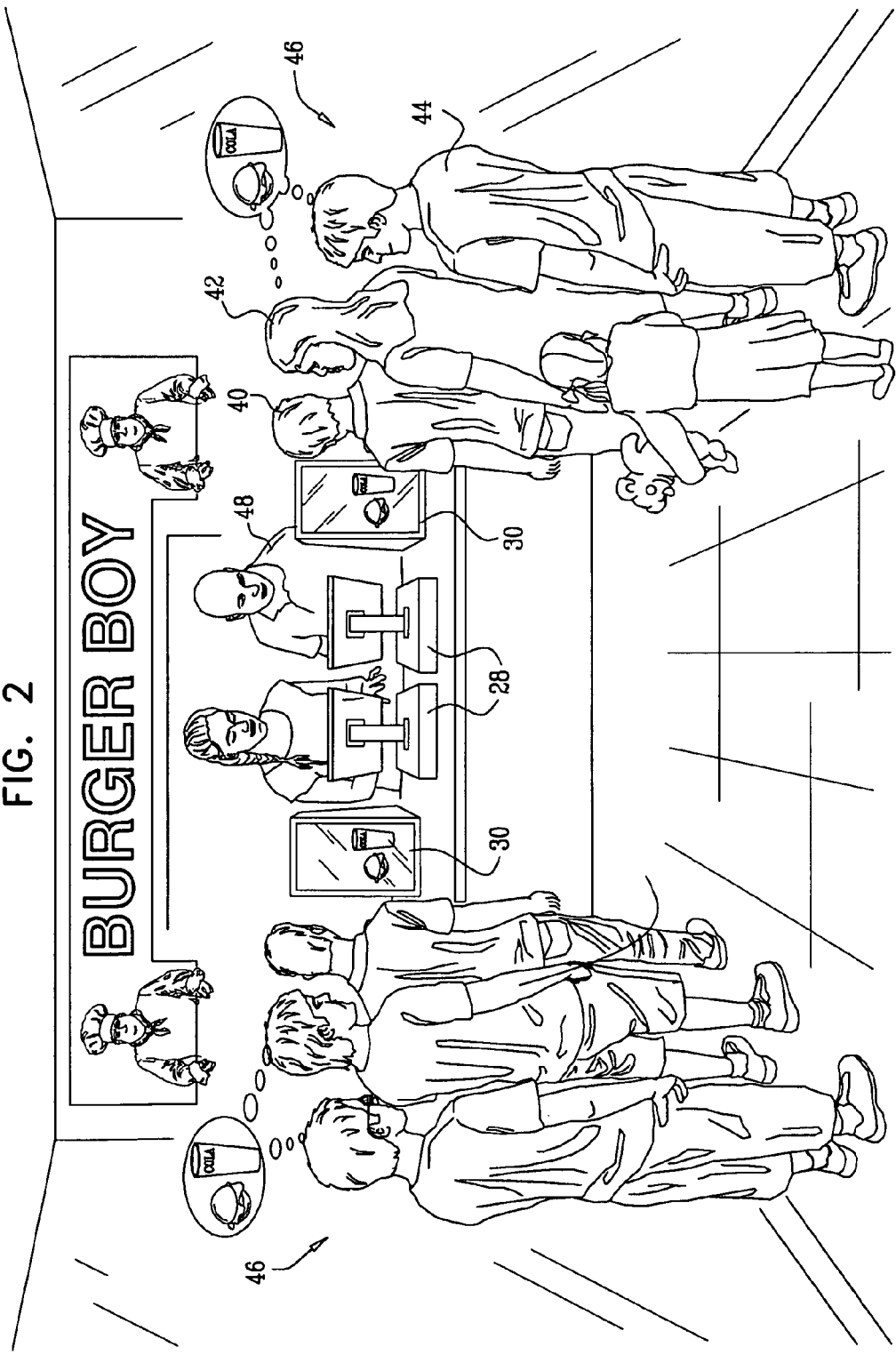
FIG. 2 is a schematic, pictorial illustration of a point-of-sale merchandising system deployed at a retail facility, in accordance with an embodiment of the present invention.

FIG. 2 is a schematic, pictorial illustration showing deployment of POS merchandising subsystems 22 at a retail facility, in accordance with an embodiment of the present invention. In this embodiment, customers 40, 42, 44 are waiting in a check-out line 46. In some deployments, there may be more than one such line, as shown in the figure. Customers 40, 42, 44 are served by a cashier 48 using POS sales terminal 28. A customer-facing display terminal 30 is positioned at check-out line 46 for convenient viewing by at least the first customer (customer 40) in check-out line 46, and typically by other customers who are waiting in the line, as well. These other customers may also view additional customer-facing display terminals that are positioned elsewhere in the retail establishment, such as at the heads of other lines.

In an embodiment of the present invention, POS merchandising subsystem 22 is configured by manager 34 to display a sequence of promotional images on customer-facing display terminal 30 to customer 40 and to customers 42, 44, who are waiting while customer 40 is being served at terminal 28. The promotional images may include video or still images of the products, text, or any composite display of video, still images, and text. POS merchandising subsystem 22 may present the promotional images in a predetermined or random order. Additionally or alternatively, at least some of the images may be selected for display responsively to a purchase made by customer 40 or to some other trigger. For example, POS merchandising subsystem 22 may promote one or more of the products customer 40 orders so as to encourage waiting customers to buy the same products. Alternatively or additionally, POS merchandising subsystem 22 may promote other products related to the products being ordered, as described hereinbelow in more detail.

In the present embodiment, manager 34 configures the sequence of promotional images to include a primary loop of promotional images, which are shown regularly and frequently. For example, there may be five images in the primary loop, which are displayed successively for ten-second intervals. Typically (although not necessarily), the primary loop advertises best-selling products. Optionally, the primary loop may present new products to establish customer awareness.

Manager 34 further configures POS merchandising subsystem 22 so that the sequence of promotional images includes a secondary group of promotional images, which are shown intermittently, interspersed with the primary loop. For example, the secondary group may include twenty images, one or which is displayed for ten seconds after each run through the primary loop. The secondary group may advertise mid-selling products or other products of secondary importance. Additionally or alternatively, images in the secondary group may be displayed in response to a certain trigger event. For example, when customer 40 orders a coffee, subsystem 22 may automatically display an image advertising croissants on display terminal 30, in order to encourage the customer (or those behind him in line or in parallel waiting lines) to make an additional purchase to go with his coffee.

The division of images into primary and secondary groups (or loops), as described above, has been found to be promotionally effective in certain types of business establishments, but it is not essential in any way to the present invention. Rather, this division is described in order to illustrate how the principles of the present invention may be applied in evaluating both frequent and infrequent image displays. The methods described hereinbelow may be applied to substantially any sort of image sequences, with appropriate adaptation for the sequence timing that is used in practice.

As noted earlier, POS server 26 records each sale made by each of terminals 28, including the items ordered and the time of the transaction. The sales records may be stored in database 32, for example. Server 26 also maintains a record of the times at which each of the promotional images in the primary loop and the secondary group was displayed on terminal 30. Based on these records, central server 24 is able to determine, for each sale, which of the images could have influenced the customer, by virtue of having been displayed while the customer was placing his or her order or standing on line. (The amount of time a customer stood in line before making a purchase can be estimated statistically from the sales records, as described further hereinbelow.) On this basis, the central server can then compare the rate of sales of each product made under the influence of a given promotional image with a reference rate of sales that is independent of that image. This comparison gives an accurate measure of the actual influence of the image, both on sales of the product that it is meant to promote and on sales of other products. Detailed methods and results of such comparisons are described hereinbelow.

Promotional Impact Measurement

Figure 3:
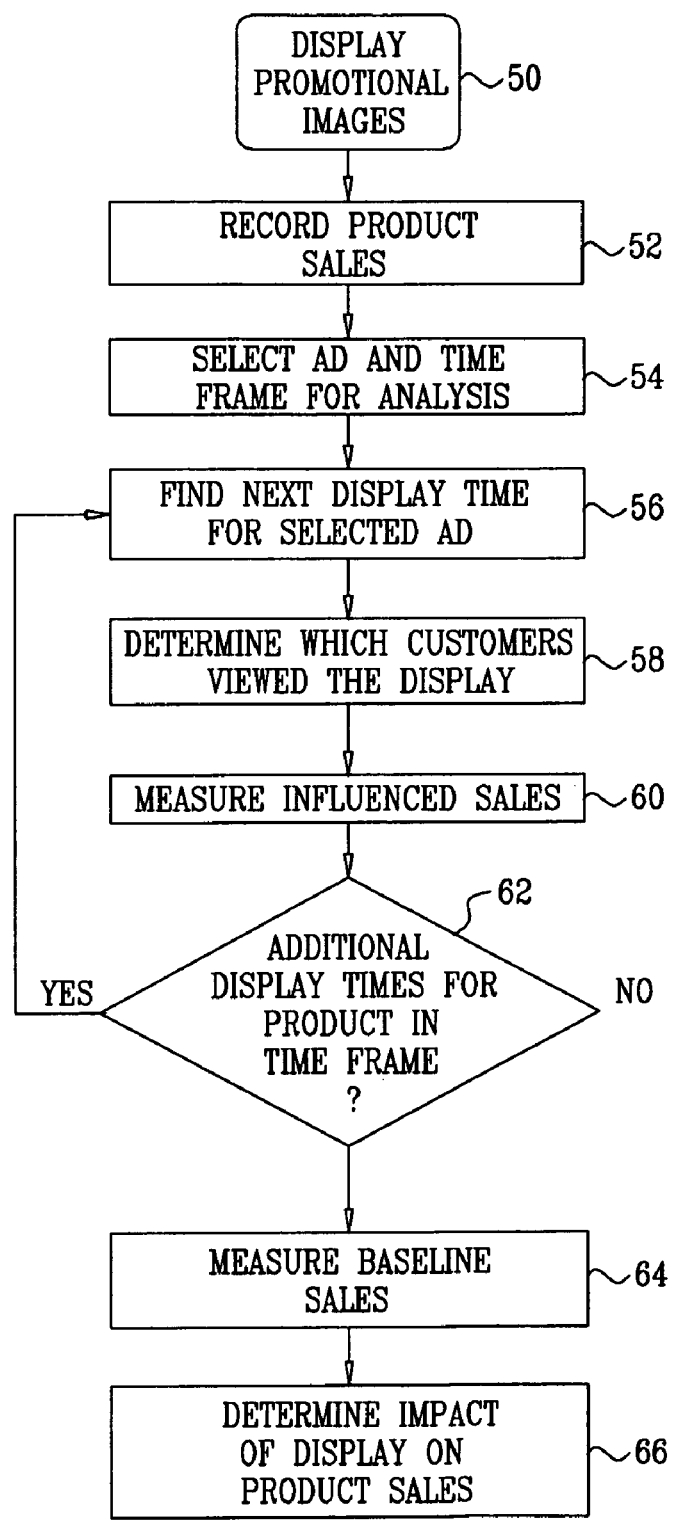
FIG. 3 is a flow chart that schematically illustrates a method for measuring a relationship between display of a certain promotional image and product sales, in accordance with an embodiment of the present invention.

FIG. 3 is a flow chart that schematically illustrates a method for measuring a relationship between display of a certain promotional image and product sales, in accordance with an embodiment of the present invention. For convenience and clarity, the method is described hereinbelow with reference to system 20, shown in FIGS. 1 and 2. It is assumed in this description that the method is carried out with respect to a certain image in the secondary group described above, which is shown intermittently at certain known times (which are either predetermined or triggered by some event, such as sale of a product). Alternatively, the method may be carried out in other POS promotional image display configurations and using other modes of selection of images to present and evaluate.

The method of FIG. 3 is less suitable for evaluating the impact of images that are shown very frequently, such as the images in the primary loop, since nearly all customers see all of these images while waiting in line. An alternative method for evaluating the impact of such images is described hereinbelow with reference to FIG. 5.

POS merchandising subsystem 22 displays promotional images of products on display terminal 30 at specified times, at a promotional image display step 50, as described hereinabove. POS merchandising subsystem 22 records product sales, at a product sale recording step 52. POS sales terminal 28 typically record sales data such as product identifiers and sales times, and may also record other information such as a customer identifier and transaction amounts.

Once sufficient time has elapsed to collect statistically-significant amounts of sales and display data, manager 34 or an automated management software program chooses a promotional image (ad) to evaluate, in addition to an analysis time frame, at an ad selection step 54. The time frame may be a continuous period of one or more hours, days or weeks. Alternatively, the time frame may be discontinuous, consisting of a particular time segment (such as the morning or evening hours) over a number of days, for example, or a certain day or days of the week over a number of weeks.

Server 24 consults database 32 to select each successive display time of the chosen image over the time frame in question, at a time selection step 56. For each such display time, the server then identifies the sales transactions that were made by customers who saw the image at that display time, at a customer identification step 58. These transactions are said to have been "influenced" by the image.

To determine whether a customer who made a given purchase at time $t_1$ should be considered to have seen an image that was presented at some earlier time $t_0$, server 24 estimates the time that the customer spent waiting on line and making the transaction. (Of course, there is no guarantee that the customer actually looked at the images that were presented during this time, or that the estimate of time spent waiting on line is precise; but by overestimating the number of customers who are considered to have been influenced by an image, server 24 ensures that the measured impact of the image will at worst be underestimated, rather than overestimated.) As a general rule, if the differences between the times at which successive customers began their transactions were less than some threshold, then it can be assumed that the later customer in the succession waited in line behind the prior customer. The length of the line can be inferred from the number of successive transactions that began at sub-threshold times, up to some limit on the possible length of the line.

The lengths of the transaction and waiting times will vary among different business establishments, depending on the type of goods sold and other factors, and should therefore be estimated empirically in each case. For example, in a self-service coffee shop that the inventors studied, they found that in the absence of a line, a customer still spends a median time of 13 sec in reaching the cashier and starting to place an order. During this time, the customer is exposed to whatever promotional images were displayed. (In addition, the customer may be influenced, though typically to a lesser degree, by images shown as he or she is starting to place an order at the head of the line, and this potential influence time may also be taken into account.) The median time between transactions was 30 sec, with 80% of transactions taking place within 60 sec of the previous transaction. The inventors therefore assumed in their analysis that customers who made a transaction within 60 sec of the previous transaction had waited in the line, up to a maximum line length of four people.

Additionally or alternatively, the length of the waiting line may be determined by other means. For example, video images of the POS may be captured and analyzed in order to measure the length of the line.

Returning now to FIG. 3, server 24 tabulates the product sales that were made to customers who were "influenced" at each display time of the selected image, at a sales measurement step 60. In other words, the server notes the types and numbers of items that were purchased by customers who were preparing to make their purchases or waiting in line while the image was displayed. The server may tabulate the influenced sales of any and all products at this stage. Typically, the server measures the sales of the product that the given image was intended to promote. More generally, however, the server may measure sales of related products in order to identify cross-influences, which may be either positive or negative. For example, an image advertising a breakfast special may influence sales of orange juice, or an image of a tuna salad bowl may influence sales of tuna sandwiches.

In any case, for each product, the server normalizes the sales measure to a fractional value, given by the number of "influenced" customers who bought the product divided by the total number of "influenced" customers identified at step 58. To obtain results that are statistically significant for a given product, it is desirable that the time frame set at step 56 be long enough to collect a relatively large number of sales of the product that were made to such influenced customers. The number of sales required for statistical accuracy can be calculated and typically varies among different business establishments. For example, in analyzing sales in a coffee shop, the inventors found that at least fifty such sales were needed in order to give moderately reliable results, and that precise results were obtained when the sample included at least one hundred sales.

The selection of influenced customers may be further refined to examine the impact of "triggered" advertisements, i.e., display of a certain promotional image when a customer orders a certain product. These advertisements may be for the same product that was ordered, so as to encourage people standing in line to order the same product, or they may be for another product, such as an image of a croissant that is presented when a customer orders coffee. In such cases, only customers who were influenced by the triggered image may be counted at step 60, even if the same image was also displayed at other times.

The server continues with this measurement process until it finishes iterating over all of the display instances in the selected time frame, at a display time iteration step 62.

For each product of interest, server 24 measures the baseline sales over the selected time frame, at a baseline measurement step 64. Typically, this baseline is simply the total number of sales of the product in question over the time frame. Alternatively, the time slots during which "influenced" customers were considered at step 60 may be excluded from the baseline calculation. The baseline sales number is likewise normalized by the total number of customers served during the baseline time frame to give the reference rate of sales.

Server 24 then compares the normalized measure of influenced sales from step 60 with the normalized baseline measurement of step 64 in order to calculate the impact of the selected image on product sales, at an impact determination step 66. The sales "uplift" for a given product can be taken to be the difference (or ratio) between the normalized measures. In other words, if the percentage of customers who bought a certain product after having been influenced by a given image is significantly greater than the baseline percentage, it can then be concluded that the image was effective in promoting sales of the product. The uplift gives a quantitative measure of this effectiveness.

Figure 4:
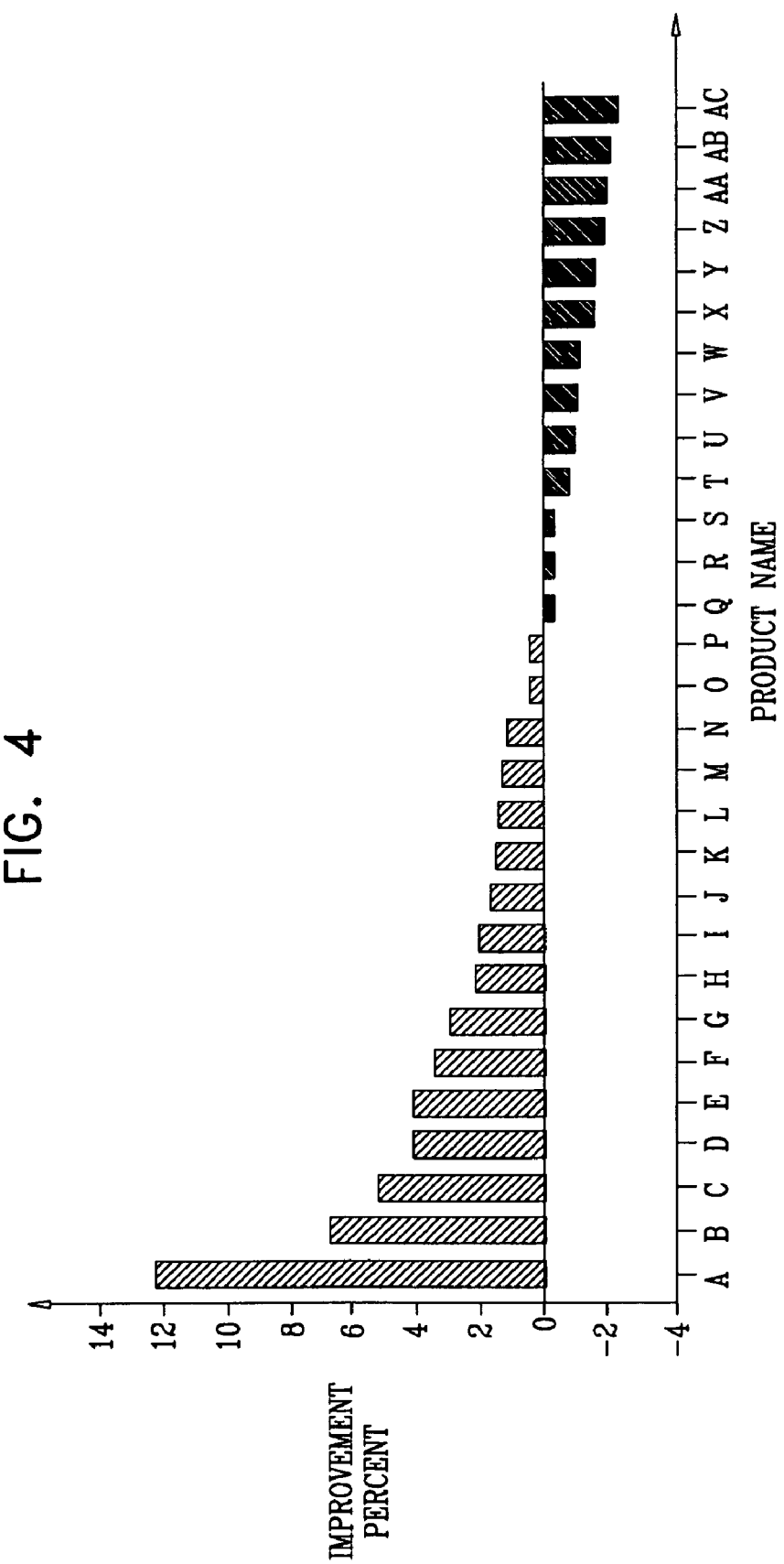
FIG. 4 is a bar chart showing the impact of display of a certain promotional image on sales of various products, in accordance with an embodiment of the present invention.

FIG. 4 is a bar chart that shows the impact of display of a certain promotional image on sales of various products, as determined using the method of FIG. 3, in accordance with an embodiment of the present invention. The different products are labeled arbitrarily A through AC on the horizontal axis, while the vertical axis shows the percentage uplift (improvement) in sales of each product due to the influence of a promotional image of product A. Displaying the image of product A gave a 12% uplift in sales of product A. It also significantly improved the sales of products B-E. On the other hand, it had a negative impact on the sales of products Z-AC.

(In the actual example on which this figure is based, product A was a breakfast special. Products B-E were salads, mineral water, and carrot juice, whose sales increased presumably because the breakfast image stimulated customers' appetites and thirst. Products Z-AC included hot drinks and croissants, whose sales apparently suffered when customers chose to order a full breakfast rather than an individual drink or pastry.)

Manager 34 can use the sort of information provided by FIG. 4, possibly together with other information provided by server 24, such as price and profit per product and total purchase amounts, in modifying the sequence of images shown on display 30. For example, the manager may choose to increase the frequency of display of the image of product A, and may possibly even add it to the main loop. On the other hand, the manager can gauge the negative impact of increasing the frequency of advertising product A on sales of other products—both directly, as illustrated in FIG. 4, and indirectly as a result of the decrease in time available to display other images when product A is displayed—and may decide on this basis to reduce the frequency of advertising the product. If the analysis of FIG. 3 focused on a particular time of day or day of the week, it can serve as the basis for specific advertising decision with respect to that time frame. As another example, if the image of product A provided an unexpectedly small uplift in sales of the product, the manager may replace the image with another, more effective image.

By the same token, server 24 may be programmed to analyze alternative advertising scenarios based on the sort of information that is provided by the method of FIG. 3 and to recommend changes that will increase revenues and/or profits, or even to implement the changes automatically.

FIG. 5 is a flow chart that schematically illustrates a method for measuring a relationship between display of a certain promotional image and product sales, in accordance with another embodiment of the present invention. This method, as noted earlier, is suitable particularly for analyzing the impact of images that are displayed frequently, such as images in the above-mentioned primary loop. Instead of measuring the impact on sales of intermittent presentation of a given image, the method of FIG. 5 measures the impact of intermittent non-presentation.

The operator of a retail establishment, such as the restaurant shown in FIG. 2, will typically be reluctant to remove images from the primary loop, since these images represent best-selling products and are important in building revenues. On the other hand, it is possible that at least some of the images are not so effective promotionally as might be thought. In order to assess this latter possibility, a selected image (or images) is removed from the primary loop intermittently, for certain trial periods, thereby trading off a possible short-term loss in revenues for information that can be used to optimize the advertising program in the long term. Typically, the trial periods are limited to a small fraction of the overall operating hours of the business establishment, such as less than 20%, or even less than 10% of the total operating hours during the period of evaluation.

In order to establish a baseline, display terminal 30 is driven to display a sequence of promotional images, including the image that is to be evaluated, at a baseline display step 70. (In this case, the baseline corresponds to sales made under the influence of the image being evaluated, in contrast to the method of FIG. 3, in which the baseline corresponds to non-influenced sales.) Sales terminal 28 passes records of product sales during the baseline display period to server 24, which records the sales in database 32, at a baseline recording step 72. In typical operation of a retail establishment, steps 70 and 72 take place regularly during business hours.

Manager 34 or an automated management program selects a promotional image for analysis, at an image selection step 74. Server 24 then directs terminals 30 not to display the selected image during certain predetermined time frames, at an image removal step 76. For example, an image that is normally displayed in the primary loop may be removed from the primary loop for half an hour at certain times of day. Server 24 measures the product sales that take place during these time frames, at a trial measurement step 78. As in the method of FIG. 3, the sales that are analyzed typically include the specific product that is advertised by the image selected at step 74, but sales of other products that may be affected by the image in question, or of all other products sold in the establishment, may also be analyzed.

Server 24 measures the product sales during comparable time frames in which the selected image has been displayed, at a baseline measurement step 80. The comparison may be very precise, in the sense that sales may be measured at the same times of day (and possibly the same days of the week) with and without presentation of the selected image. Server 24 then analyzes the differences in sales between the trial periods and the baseline periods in order to determine the actual impact on sales of the promotional image in question, at an impact determination step. In this case, the normalized measurement of "influenced" sales is simply the total number of sales of a given product divided by the total number of customers served during the baseline period, when the image in question was displayed. The normalized, reference measurement of "non-influenced" sales is the same quotient taken during the trial periods when the image was not displayed. The difference between the normalized reference and "influenced" measurements gives the sales uplift for the given product due to the tested image.

FIG. 6 is a bar chart showing the impact of display of a certain promotional image on sales of a product promoted by the image, in accordance with an embodiment of the present invention. The left bar shows the average rate of sales of a certain product that is displayed in a promotional image, wherein the average is taken over both baseline periods, during which the image is displayed, and trial periods during which it is not displayed. The middle bar shows the rate of sales of the product during the baseline periods, while the right bar shows the rate during the trial periods. The marked impact of the image in question on sales of the product can be clearly seen. On the other hand, because the trial periods are short, the deleterious impact on average sales is minor.

The novel methods of POS data collection and analysis that are described above may be used in other ways, as well, to increase promotional effectiveness. For example, the statistical techniques described above may be used to determine whether there is a waiting line at the sales terminal, and possibly to estimate the length of the line. The sequence of images that is displayed on the display terminal may be adjusted accordingly, or other steps may be taken to enhance the effectiveness of the sales process.

In one such embodiment, the average time between successive buyers over some time period, such as the past ten minutes, is tracked as a sort of "POS Pressure Index," while the duration of each sales transaction (between the first keystroke by the cashier and conclusion of the transaction) is defined as a "POS Sales Lag Index." The POS subsystem may change the sequence of images that it presents according to these two parameters. For example, when the POS Pressure Index is high, and the POS Sales Lag Index is high, too, it is likely that there is a waiting line at least partially because the sales process is slow. Under such circumstances, the POS display terminal may be switched to a specific set of media content that is geared to help customers decide what they want to buy as soon as they reach the head of the line (as opposed to pushing them to consider additional choices).

Additionally or alternatively, upon determining that the line is long, the display terminal may be switched to show longer ads. For example, instead of displaying each image for eight seconds, the display time may be switched to twenty seconds, and video clips may be inserted.

Although the methods and results presented above relate, for the sake of clarity and concreteness of illustration, to a particular point of sale configuration, and specifically to the system elements shown in FIGS. 1 and 2, the principles of the present invention may similarly be applied at points of sale in other sorts of establishments that sell goods and/or services to a large customer base. The terms "business" and "establishment" as used herein should therefore be understood broadly to include any point of sale location, and the term "product" should be understood broadly to include any and all sorts of products and services that may be offered at such locations.

It will thus be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method for distribution of information, comprising:
   displaying a sequence of promotional images at known, respective display times on a display terminal facing customers at a point of sale;
   recording, by a computer, sales of different products at respective sale times on a sales terminal at the point of sale;
   measuring, by the computer, a relationship between the sales times of at least one of the products and the display times of at least one of the promotional images; and
   responsively to the relationship, making a change in the sequence of the promotional images that are displayed on the display terminal,
   measuring the relationship comprises identifying the customers to whom a given promotional image was displayed at the point of sale, and evaluating the sales made to the identified customers.

2. The method according to claim 1, wherein the promotional images advertise different, respective products, and wherein measuring the relationship comprises assessing an impact of displaying a given image in the sequence on a respective product that is advertised by the given image.

3. The method according to claim 2, wherein measuring the relationship comprises assessing a further impact of displaying the given image on one or more other products that are not advertised by the given image.

4. A method for distribution of information, comprising:
   displaying a sequence of promotional images advertising respective advertised products, at known, respective display times on a display terminal facing customers at a point of sale;
   recording, by a computer, sales of different products at respective sale times on a sales terminal at the point of sale;
   assessing, by the computer, an impact of displaying a given image in the sequence on sales of a respective product that is advertised by the given image and on one or more other products that are not advertised by the given image; and
   responsively to the relationship, making a change in the sequence of the promotional images that are displayed on the display terminal.

5. The method according to claim 1, wherein measuring the relationship comprises comparing the sales made to the identified customers with the sales made to other customers during a reference period in which the given promotional image was not displayed.

6. The method according to claim 5, wherein comparing the sales comprises computing a sales uplift for a given product due to the given promotional image by comparing a first fraction of the identified customers who purchased the given product with a second fraction of the other customers who purchased the given product.

7. The method according to claim 5, wherein displaying the sequence of the promotional images comprises displaying the given promotional image intermittently, so that most of the customers are not exposed to the image at the point of sale, and wherein identifying the customers comprises selecting the customers whose sales times fell within a specified period following each of the display times of the given promotional image.

8. The method according to claim 7, wherein selecting the customers comprises estimating a length of a line of the customers waiting to make a purchase at the point of sale, and setting the specified period responsively to the estimated length.

9. The method according to claim 5, wherein displaying the sequence of the promotional images comprises displaying the given promotional image regularly during a baseline period, so that most of the customers are exposed to the image at the point of sale, and wherein the reference periods comprise less than 20% of a total operating time of the point of sale.

10. The method according to claim 1, and comprising estimating, responsively to the sales times, a length of a waiting line of the customers at the point of sale, and responsively to the estimated length, altering the sequence of the promotional images that are displayed on the display terminal.

11. The method of claim 1, wherein identifying the customers to whom a given promotional image was displayed comprises determining the differences between the times at which successive customers began their transactions and assuming a costumer viewed a promotional image displayed before the customer's transaction began if the difference is less than a given threshold.

12. Apparatus for distribution of information, comprising:
a display terminal for displaying a sequence of images to customers at a point of sale;
a sales terminal, for recording sales of different products at respective sale times at the point of sale; and
a processor, which is coupled to the display terminal and to the sales terminal and is configured to drive the display terminal to display a sequence of promotional images at known, respective display times, and to measure a relationship between the sales times of at least one of the products and the display times of at least one of the promotional images, by identifying the customers to whom a given promotional image was displayed at the point of sale, and evaluating the sales made to the identified customers.

13. The apparatus according to claim 12, wherein the processor is configured to make a change, responsively to the relationship, in the sequence of the promotional images that are displayed on the display terminal.

14. The apparatus according to claim 12, wherein the promotional images advertise different, respective products, and wherein the processor is configured to measure an impact of displaying a given image in the sequence on a respective product that is advertised by the given image.

15. The apparatus according to claim 14, wherein the processor is configured to assess a further impact of displaying the given image on one or more other products that are not advertised by the given image.

16. The apparatus according to claim 12, wherein the processor is configured to compare the sales made to the identified customers with the sales made to other customers during one or more reference periods in which the given promotional image was not displayed.

17. The apparatus according to claim 16, wherein the processor is configured to compute a sales uplift for a given product due to the given promotional image by comparing a first fraction of the identified customers who purchased the given product with a second fraction of the other customers who purchased the given product.

18. The apparatus according to claim 16, wherein the processor is configured to drive the display terminal to display the given promotional image intermittently, so that most of the customers are not exposed to the image at the point of sale, and to identify the customers whose sales times fell within a specified period following each of the display times of the given promotional image.

19. The apparatus according to claim 18, wherein the processor is configured to estimate a length of a line of the customers waiting to make a purchase at the point of sale, and to set the specified period responsively to the estimated length.

20. The apparatus according to claim 16, wherein the processor is configured to drive the display terminal to display the given promotional image regularly during a baseline period, so that most of the customers are exposed to the image at the point of sale, and wherein the reference periods comprise less than 20% of a total operating time of the point of sale.

21. A computer software product, comprising a non-transitory computer-readable medium in which program instructions are stored, which instructions, when read by a computer, cause the computer to display a sequence of promotional images at known, respective display times on a display terminal facing customers at a point of sale, to record sales of different products at respective sale times on a sales terminal at the point of sale, to measure a relationship between the sales times of at least one of the products and the display times of at least one of the promotional images, and to assess an impact of displaying a given image in the sequence on sales of a respective product that is advertised by the given image and on one or more other products that are not advertised by the given image.

22. The computer software product of claim 21, wherein the instructions cause the computer to display the sequence of promotional images such that one or more of the images in the sequence are not displayed for periods sufficient to allow comparative assessment of the effect of the image on sales.

23. The computer software product of claim 21, wherein the instructions additionally cause the computer, responsively to the relationship, to make a change in the sequence of the promotional images that are displayed on the display terminal.

24. The method according to claim 4, comprising identifying the customers to whom a given promotional image was displayed at the point of sale, and evaluating the sales made to the identified customers.

25. The method of claim 4, wherein displaying a sequence of promotional images comprises displaying one or more of the images of the sequence during at least 80% of the operating hours of the point of sale, but not displaying the one or more of the images during some periods, and wherein assessing an impact of displaying a given image comprises comparing the sales of products during times at which the one or more of the images were displayed to the sales during times the images were not displayed.

26. The method of claim 4, wherein responsively to the relationship, making a change in the sequence of the promotional images comprises making the change automatically by the computer.

* * * * *